(No Model.)

I. R. BLUMENBERG.
Generator for Hydrocarbon Engines.

No. 236,411.          Patented Jan. 11, 1881.

Attest:
Courtney A. Cooper
J. O. McCleary

I. R. Blumenberg
By his attorney
Charles E. Forte

UNITED STATES PATENT OFFICE.

ISRAEL R. BLUMENBERG, OF WASHINGTON, DISTRICT OF COLUMBIA.

GENERATOR FOR HYDROCARBON-ENGINES.

SPECIFICATION forming part of Letters Patent No. 236,411, dated January 11, 1881.

Application filed October 9, 1880. (No model.)

*To all whom it may concern:*

Be it known that I, ISRAEL R. BLUMENBERG, of Washington, District of Columbia, have invented an Improvement in Generators for Hydrocarbon-Engines, of which the following is a specification.

My invention relates to that class of motors in which a volatile liquid is vaporized and condensed, and operates by its expansion to propel the engine; and my invention consists of a generator whereby to volatilize the motor-fluid as rapidly as it is introduced, with the consumption of a comparatively small amount of fuel.

Figure 1:
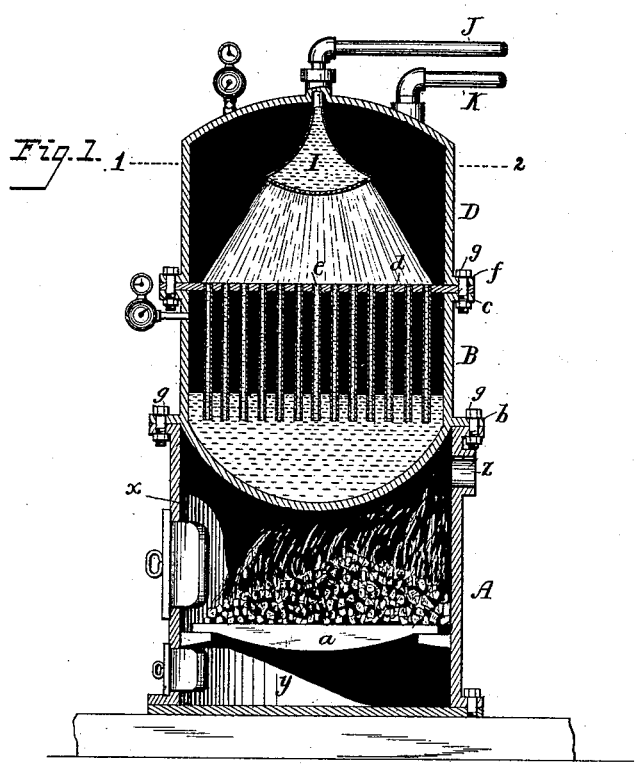
Figure 2:
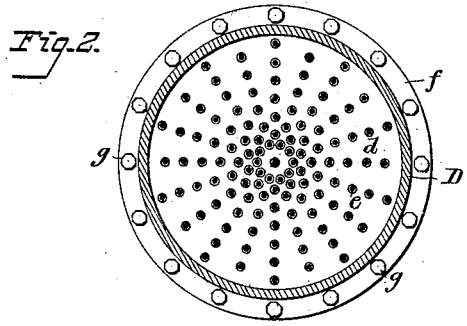

In the drawings, Figure 1 is a sectional elevation, showing my improved generator in connection with the fire-box; and Fig. 2 is a section on the line 1 2, Fig. 1.

A represents a cylindrical casing, divided by a grate, $a$, into a fire-chamber, $x$, and ash-pits $y$, each provided with a suitable door at one side, an opening, $z$, near the top of the fire-box and opposite the door, affording communication with a suitable uptake.

A cylindrical round-bottom vessel, B, open at the top and provided with flanges $b$ $c$, is adapted to fit within the top of the cylinder A, as shown, and to receive upon its upper end a plate or disk, $d$, into which are securely fastened the upper ends of a large number of small pipes, $e$, all closed at their lower ends, and extending into the vessel B, which is partially filled with water.

Upon the disk $d$ rests an inverted vessel or a dome, D, having a flange, $f$, through which, and through flange $c$ and intervening disk $d$, are passed bolts $g$, securely bolting together the vessels D B and disk $d$.

Centrally within the dome D is arranged a rose or other sprinkling device, which communicates with an inlet-pipe, J, an outlet-pipe, K, leading from the chamber within the dome to the engine, the inlet-pipe communicating with the pump, condenser, and exhaust.

The rose or other spray device I is so constructed and arranged in respect to the tubes $e$ that any liquid forced through the rose will be equally distributed into the open mouths of the tubes in such small quantities and over such a comparatively extended surface in each that the whole body of liquid will be completely vaporized before any portion can reach the lower ends of the tubes. By this means the accumulation of liquid in the generator is avoided and a rapid vaporizing of the same effected with a comparatively small amount of fuel, as there is no loss by evaporation from within the closed vessel B, and but little loss of heat in its transmission from the fire to the volatile liquid.

I claim—

1. A generator for volatile liquids, consisting of a closed vessel, B, containing water, means for heating the water in said vessel, a dome, D, plate $d$, carrying a series of tubes, $e$, and a spray, I, connected with the inlet-pipe, and constructed and arranged to distribute and discharge the fluid equally into the mouths of the pipes $e$, substantially as set forth.

2. A combination of the cylinder A, containing the fire-place, flanged vessel B, flanged dome D, plate $d$, carrying the tubes $e$, and bolted between the flanges of the vessels D B, and spray I, arranged as set forth.

In testimony whereof I have signed my name to this specification in the presence of two subscribing witnesses.

ISRAEL R. BLUMENBERG.

Witnesses:
 F. M. GREEN,
 CHARLES E. FOSTER.